(12) United States Patent
Malsbenden

(10) Patent No.: US 8,751,330 B2
(45) Date of Patent: *Jun. 10, 2014

(54) SYSTEM FOR ORDERING PRODUCTS AND FORECASTING CUSTOMER INTEREST

(75) Inventor: Francis A. Malsbenden, Greenwich, CT (US)

(73) Assignee: Columbia Insurance Company, Omaha, NE (US)

( * ) Notice: Subject to any disclaimer, the term of this patent is extended or adjusted under 35 U.S.C. 154(b) by 871 days.

This patent is subject to a terminal disclaimer.

(21) Appl. No.: 12/889,077

(22) Filed: Sep. 23, 2010

(65) Prior Publication Data

US 2011/0016012 A1    Jan. 20, 2011

Related U.S. Application Data

(63) Continuation of application No. 11/479,451, filed on Jun. 30, 2006, now Pat. No. 7,848,957.

(51) Int. Cl.
 *G06Q 30/00* (2012.01)
 *G06Q 30/06* (2012.01)
 *G06Q 30/02* (2012.01)
(52) U.S. Cl.
 CPC ........ *G06Q 30/0621* (2013.01); *G06Q 30/0246* (2013.01); *G06Q 30/0601* (2013.01); *G06Q 30/0605* (2013.01)
 USPC ...... 705/26.5; 705/14.45; 705/26.1; 705/26.2
(58) Field of Classification Search
 CPC .......... G06Q 30/0601; G06Q 30/0605; G06Q 30/0641; G06Q 30/0242; G06Q 30/0246; G06Q 30/0621
 USPC ........ 705/26.1, 26.2, 27.1, 14.41, 14.45, 26.5
 See application file for complete search history.

(56) References Cited

U.S. PATENT DOCUMENTS

| | | | |
|---|---|---|---|
| 6,489,968 B1 | 12/2002 | Ortega et al. | |
| 6,505,185 B1 | 1/2003 | Chickering | |
| 6,604,089 B1 | 8/2003 | Van Horn et al. | |
| 6,963,848 B1 | 11/2005 | Brinkerhoff | |
| 7,346,549 B2 | 3/2008 | Deas et al. | |
| 7,848,957 B2 * | 12/2010 | Malsbenden | 705/27.1 |

(Continued)

FOREIGN PATENT DOCUMENTS

KR     20050001121 A    1/2005

OTHER PUBLICATIONS

Partridge, C., "You've Got the Order—Now Deliver"; times of London, Features Section, Mar. 24, 2000; 3 pages.*

(Continued)

*Primary Examiner* — Nicholas D Rosen
(74) *Attorney, Agent, or Firm* — IP Attorneys Group, LLC

(57) ABSTRACT

The invention relates to a system for ordering a product and forecasting consumer interest, including a computer, software executing on the computer for listing a plurality of products for purchase, software executing on the computer for determining when a user views a product of the plurality of products, software executing on the computer for determining when a user orders a product of the plurality of products, software executing on the computer for tolling the views of each product and for tolling the orders of each product, software executing on the computer for identifying a first customer based on the tolled views, and software executing on the computer for identifying a second customer based on the tolled orders.

20 Claims, 4 Drawing Sheets

(56) References Cited

U.S. PATENT DOCUMENTS

| | | |
|---|---|---|
| 2002/0004765 A1 | 1/2002 | Han et al. |
| 2002/0111865 A1 | 8/2002 | Middleton, III et al. |
| 2003/0093335 A1 | 5/2003 | Silverbrook et al. |
| 2004/0010433 A1* | 1/2004 | Grettve et al. ............... 705/7 |
| 2004/0128257 A1 | 7/2004 | Okamoto et al. |
| 2007/0073585 A1 | 3/2007 | Apple et al. |
| 2007/0260512 A1 | 11/2007 | Sattley et al. |
| 2008/0250026 A1 | 10/2008 | Linden et al. |

OTHER PUBLICATIONS

Anon; "Product Watch: Press Release Newsletter"; Design News. vol. 60; No. 18; p. 83; Dec. 5, 2005.
Partridge, C.; "You've Got the Order—Now Deliver"; Times of London, Features Section, Mar. 24, 20001; 3 pages.

* cited by examiner

SYSTEM FOR ORDERING PRODUCTS AND FORECASTING CUSTOMER INTEREST

CROSS-REFERENCE TO RELATED APPLICATIONS

This application is a continuation of U.S. patent application Ser. No. 11/479,451 filed on Jun. 30, 2006, and issued as U.S. Pat. No. 7,848,957 on Dec. 7, 2010, the content of which is incorporated herein by reference.

FIELD OF THE INVENTION

The invention relates to systems and methods for ordering products.

BACKGROUND OF THE INVENTION

Some consumers order products or services through the internet because it is convenient and it saves time as opposed to traveling to and from a store. Other consumers may find the selection is more abundant at an internet site since a site may carry numerous brands and varieties of a single product, such as a shoe, whereas a store may be limited due to space availability or costs associated with having a large inventory of products.

Further, merchants may find advertising on the internet to be advantageous because its low cost relative to advertisements on other media, such as radio, television, or printed ads. Advertisements on the internet also have the ability to reach many more consumers than traditional advertisements.

However, when a consumer decides to place an order for a product or service, the consumer may encounter several obstacles that may discourage the consumer from proceeding, thereby negating any benefits from advertising on the internet. A typical obstacle is that the product or service is not available. The problem may be exacerbated if the consumer spent considerable time reading through the advertisements and compared the selected product or service against other products or services only to find out in the end it was for naught. Moreover, the ordering process may be lengthy, such as inputting personal information or payment information, and only upon getting to the end is the consumer notified the selected item is unavailable. Such problems may lead to a lost sale even if the item is made available to the customer at a later date. In a more unfortunate event, such problems may lead to a lost customer if the customer chooses not to visit such an unreliable site. Hence, an improved process for ordering products or services may alleviate the above problems.

Another use of the internet is to gather information. Although the Internet usually allows consumers access to a wealth of information concerning products or services they are considering purchasing, the reverse is often not as easy. For example, while many Internet commerce sites allow consumers to provide their reviews of a given product or service, a small percentage of consumers may actually do so. Moreover, once the reviews are given, sites normally do little, if anything, to analyze the reviews to improve their products or services in a meaningful manner to adequately conform to the suggestions in the reviews. Further, since reviews typically represent a small percentage of consumers, relying upon reviews to obtain information from consumers in general, even if products or services may be altered to conform to the reviews, may be inadequate or may not represent the majority of consumers.

Because merchants and manufacturers typically lack sufficient information about consumers' opinions, it may be difficult not only to know what consumers thought about products already purchased in the past, but it may also be difficult to gauge consumers' future interest. Even if reviews are utilized as a basis for gauging consumers' interest, future interest may also not be accurately predicted because a consumer's future purchases may not be related to past purchases for a variety of reasons, such as a change in taste by the consumer. Hence, systems, if any, that utilize reviews as a basis for gauging consumers' future interest may be flawed.

U.S. Pat. No. 6,963,848 seems to relate to encouraging consumers to submit reviews and, based on the received reviews, recommendations may be made.

Additionally, even if a consumer is interested in a product and this interest may be somehow calculated, websites often lack the ability to follow-through with the consumer to encourage the consumer to purchase a product or service. In a traditional brick and mortar store, a sales person may be available to observe an interested customer and assist the customers with samples or answer any questions. Commerce sites typically lack the salesperson to observe any interested customers or to follow-through with them.

Moreover, the types of products or services commonly available to consumers are often for those that are currently available or those that are already in production and are committed by manufacturers, such as being in the front stages of production, to be made available in the near future. Consumers are usually not solicited for purchase of products or services that are conceptual in nature or are in the beginning stages of production.

This is because a product supplier may find it cost prohibitive to make products in accordance with consumer interest, particular since interest can vary from consumer to consumer. Also, a product supplier may have long lead times associated with products and gauging consumer interest one year may not be helpful in 6 months to 1 year, which are common and times for companies importing goods from overseas. This problem may be exacerbated when fashion trends are shorter than lead times. In some cases, a product supplier may provide a product or service in accordance with measured customer interest but such cost associated with the product or service is normally higher. Hence, the customer or the product supplier may need to bear the higher cost. Further, this arrangement normally requires a commitment from both the customer and the supplier, either in the form of a deposit or contract.

What is desired, therefore, is an improved ordering process. Another desire is a system that streamlines the ordering process. A further desire is a system that streamlines the amount of advertisements a customer sees. Yet another desire is a program that permits consumers to order products that are not yet available, or may not ever be available to the general public or preferred customers. Still another desire is a program that permits consumers to order specialized products with minimized obligation to the consumer and minimized risk of loss to the product supplier. A further desire is a program that permits consumers to customize their specialized products at the time of the order. Yet another desire is a program that forecasts consumer interest so that a product supplier can meet future demand and maximize profits by providing products that are believed to be of interest to the consumers based on the forecasted consumer interest. Still a further desire is a program that identifies interested consumers to a product supplier so that the product supplier may contact the interested consumers with further information.

SUMMARY OF THE INVENTION

It is therefore an object of the invention to provide a system that permits products and/or services to be ordered in an enhanced manner.

Another object is a system that permits products and/or services to be ordered in an efficient manner without deluging a customer with unwanted mail or advertisements.

A further object of the invention is a system that permits a customer to reserve a product and/or service for a future purchase.

Yet another object is a system that allows a customer to order a specialized product and/or service with reduced risk to both the customer and product or service provider.

Still another object is a system that permits a customer to customize his/her order.

Another object is a system that forecasts customer demand.

A further object is a system that identifies preferred customers.

These and other objects of the invention are achieved by a system for ordering a product and forecasting consumer interest, including a computer, software executing on the computer for listing a plurality of products for purchase, software executing on the computer for determining when a user views a product of the plurality of products, software executing on the computer for determining when a user orders a product of the plurality of products, software executing on the computer for tolling the views of each product and for tolling the orders of each product, software executing on the computer for identifying a first customer based on the tolled views, and software executing on the computer for identifying a second customer based on the tolled orders.

In some embodiments, the system also includes software executing on the computer for transmitting the identity of the first customer to a product supplier. In further embodiments, the system also has software for transmitting the identity of the second customer to a product supplier.

In other embodiments, the system has software executing on the computer for determining a popularity of each product based on the tolled views and the tolled orders. In some of these embodiments, the system includes software executing on the computer for indicating whether a product is to be supplied based on the tolled number of orders for the product.

In another embodiment, the system has software executing on the computer for storing a list of products based on a frequency of tolled views or tolled orders.

In another aspect of the invention, the system provides software executing on the computer for listing a plurality of products for purchase, wherein each product is supplied based on orders from users, software executing on the computer for receiving an order for a product and an identity from a user, software executing on the computer for storing the identity of each user in association with the corresponding order, and software executing on the computer for, after calculating a production date of the ordered product, transmitting the identity and corresponding order to a product supplier.

In some embodiments, the system includes software executing on the computer for determining availability of the ordered product. In other embodiments, the system uses software executing on the computer for prompting the product supplier to contact the user.

In further embodiments, the system has software executing on the computer for soliciting orders from a plurality of users and for indicating whether a product is to be supplied based on the tolled number of orders for the product.

In a further aspect of the invention, the system includes software executing on the computer for receiving a plurality of orders for various products from a plurality of products, software executing on the computer for receiving a plurality of modifications to the plurality of orders, software executing on the computer for tolling orders for each product of the plurality of products to determine a popularity of each product based on the tolled orders, software executing on the computer for tolling modifications for each product of the plurality of products to determine a popularity of each product based on the tolled modifications, software executing on the computer for storing a list of the plurality of products based on the frequency of orders of each product, software executing on the computer for storing a list of the plurality of products based on the frequency of modifications of each product, software executing on the computer for indicating whether a product is to be supplied based on the tolled orders and tolled modifications for the product, and software executing on the computer for transmitting the orders and modifications to a product supplier.

In some embodiments, the system includes software executing on the computer for receiving a plurality of modifications for a single order.

In yet another aspect of the invention, a method for ordering a product and forecasting consumer interest includes the steps of providing a computer, listing a plurality of products for purchase, determining when a user views a product of the plurality of products, determining when a user orders a product of the plurality of products, tolling a number of views of each product, tolling a number of orders of each product, identifying a first customer based on the tolled views, and identifying a second customer based on the tolled orders.

In some embodiments, the method has the step of transmitting the identity of the first and second customers to a product supplier. In other embodiments, the method determines a popularity of each product based on the tolled views and the tolled orders.

In further embodiments, the method includes the step of indicating whether a product is to be supplied based on the tolled number of orders for the product and storing a list of products based on the tolled views and the tolled orders.

In still another aspect of the invention, a system for ordering a product is provided, which includes a computer, software executing on the computer for soliciting an order from a customer for an item to be provided, software executing on the computer for receiving the order, and software executing on the computer for sending an order identifier to the customer, each order identifier including an indication of the item to be provided. The invention also includes software executing on the computer for storing the order identifier, software executing on the computer for notifying the customer when the ordered item is available for purchase, software executing on the computer for prompting the customer to submit the order identifier, and software executing on the computer for matching the received order identifier with the stored order identifier for confirming the customer placed the reservation.

In some embodiments, the system further includes software executing on the computer for confirming the customer submitting the order identifier sent the solicited reservation by matching the received order identifier with the stored order identifier.

In other embodiments, the system includes the steps of software executing on the computer for prompting the customer to submit an identity of the customer, software executing on the computer for storing the identity, software executing on the computer for prompting the customer to submit the identity contemporaneously with prompting the customer to submit the order identifier, and software executing on the computer for matching the received identity and received order identifier with the stored identity and stored order identifier.

In further embodiments, the system has the step of masking the solicitation of a reservation from certain customers while permitting other customers to view the solicitation of a reservation.

Optionally, the system reminds the customer the item is available for purchase. The system may also display a list of items available to be provided, each item being reservable by the customer. In some of these embodiments, the system updates the list based on the received reservations.

In a further embodiment, the system includes the step of expiring the received reservation upon receipt of the order identifier by the customer.

DETAILED DESCRIPTION OF THE INVENTION

Figure 1:
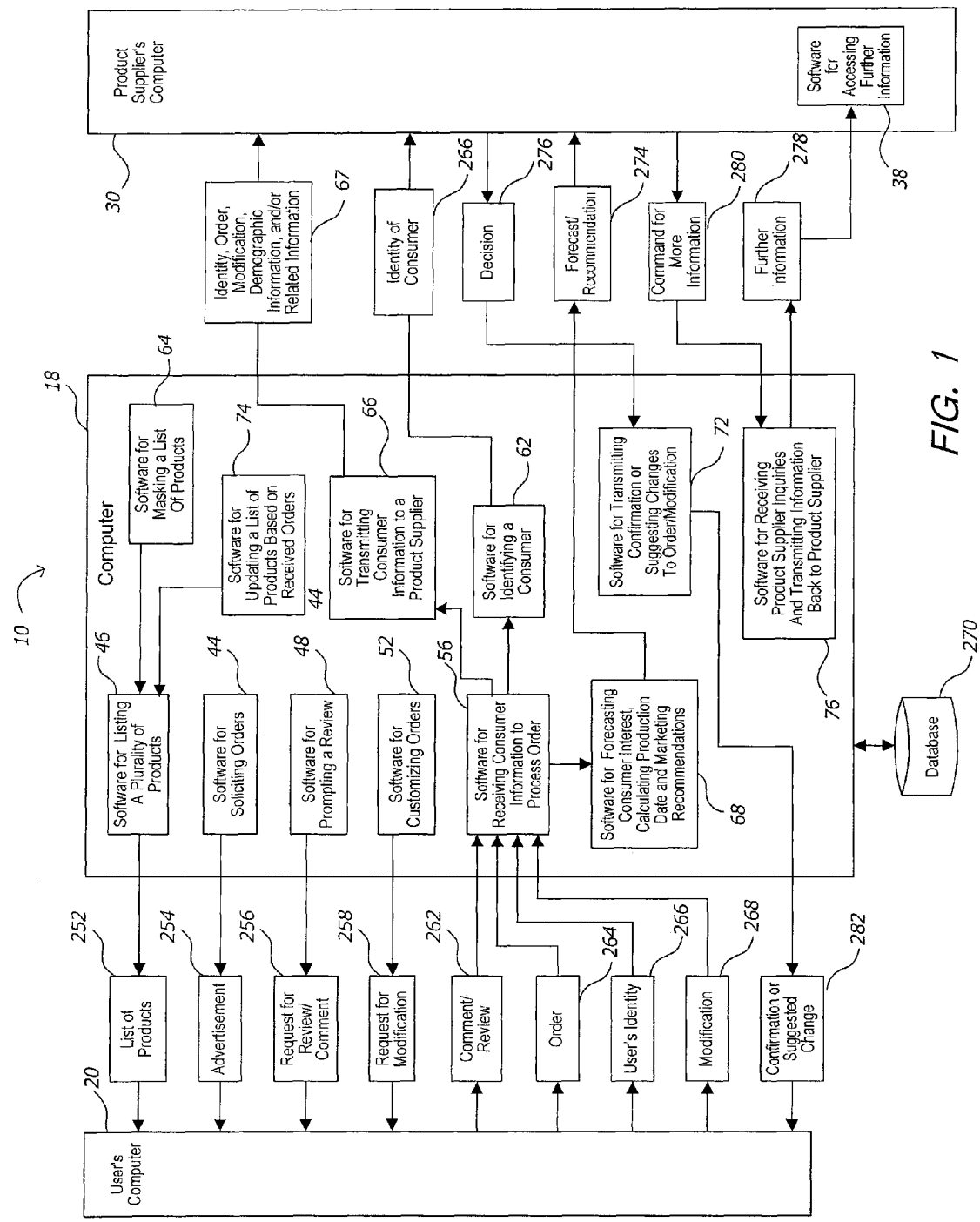
FIG. 1 depicts the system for ordering a product and forecasting consumer interest in accordance with the invention.

FIG. 1 depicts system 10 for ordering products in accordance with the invention. System 10 includes software 46 for listing a plurality of products for sale, list 252 being electronically displayed on a webpage and may include a plurality of different items where each item is available in a plurality of different sizes. In other embodiments, list 252 is a hardcopy listing of products for sale. In addition, system 10 includes steps software 44 for soliciting orders, for prompting 48 a review, and for requesting 52 customization of an order.

In some embodiments, software 44 for soliciting orders involves advertising, direct mail, or directly contacting potential buyers with the list of products. In particularly, soliciting 44 orders involves sending advertisements 254 and the like to potential buyers for enticing them to view list 252. System 10 also includes software 64 for masking a list of products so that potential buyers or preferred customers would be able to view list 252 of products while others who are not identified as potential or preferred customers may not view list 252. This permits certain customers to have an option to purchase items on list 252, whereupon a refusal by the certain customers to purchase may prompt system 10 to permit all members of the public to view the items on list 252 that were not purchased by the certain customers. System 10 also includes software 74 for updating the list of products based on the received orders 264 so that future potential or preferred customers who view list 252 would be able to see the most accurate availability of colors and/or sizes.

In other embodiments, software 48 for prompting a review involves sending request 256 to a buyer to give review or comment or opinion 262 of a product that the buyer purchased. In further embodiments, software 52 for requesting customization of an order means request 258 for modification is sent to a buyer to see if the buyer wants to make special changes to a product that is ordered.

In addition, system 10 includes software 56 for receiving consumer information, such as review 262, order 264, user's identity 266, or modification 268. It is understood that the type of information received from user's computer 20 is not limited to the above list and includes demographic information, complaints, questions, or any information sent by user's computer 20. Software 56 for receiving consumer information and software 68 for forecasting consumer interest, calculating production date, and marketing recommendations are more particularly described below.

Once consumer information is received, software 68 for forecasting consumer interest, calculating production date, and marketing recommendations sends forecast/recommendation 274 to product supplier's computer 30 so that the product supplier may make decision 276 based on the received forecast/recommendation. In some embodiments, decision 276 to be made by the product supplier may be a confirmed date for availability of the order, changes to the order, confirmation of the requested modification, suggestions to the requested modification, and the like. In other embodiments, decision 276 is any judgment made by the product supplier based in part on forecast/recommendation 274.

When the product supplier is contemplating decision 274, the product supplier may need further information 278, in which the product supplier issues command 280 to computer 18 and software 76 for receiving product supplier's inquiries or commands will transmit the requested further information 278 back to the product supplier. In some embodiments, further information 278 is additional demographic information, user identity, previous orders submitted by the user, any previous modifications submitted by the user, history of returns, and the like. Further information 278 is received by software for accessing further information 38 at product supplier's computer and processed for use by the product supplier, such as being converted into a spreadsheet.

Also, once consumer information is received, software 66 for transmitting consumer information to a product supplier transmits identity, order, modification, demographic information, and/or related information 67 to a product supplier. In addition, software 62 for identifying a consumer sends identity 266 of the consumer to the product supplier so that the product supplier may review the order, any modification to the order, and other related information for each user.

When computer 18 receives 56 consumer information, computer 18 stores the received consumer information on database 270. In addition, when the product supplier issues command 280 for further information, computer 18 retrieves the requested information from database 270 for transmission to product supplier's computer 30 in response to command 280.

When the product supplier decides upon the availability date of the ordered product or if any changes to the order are to be suggested, the product supplier sends decision 276 to computer 18, where software 72 for transmitting confirmation of the order or suggesting changes to the order transmits confirmation/suggested change 282 to user's computer 20. The suggested change is for a change to the order, change to the modification, or both.

Figure 2:
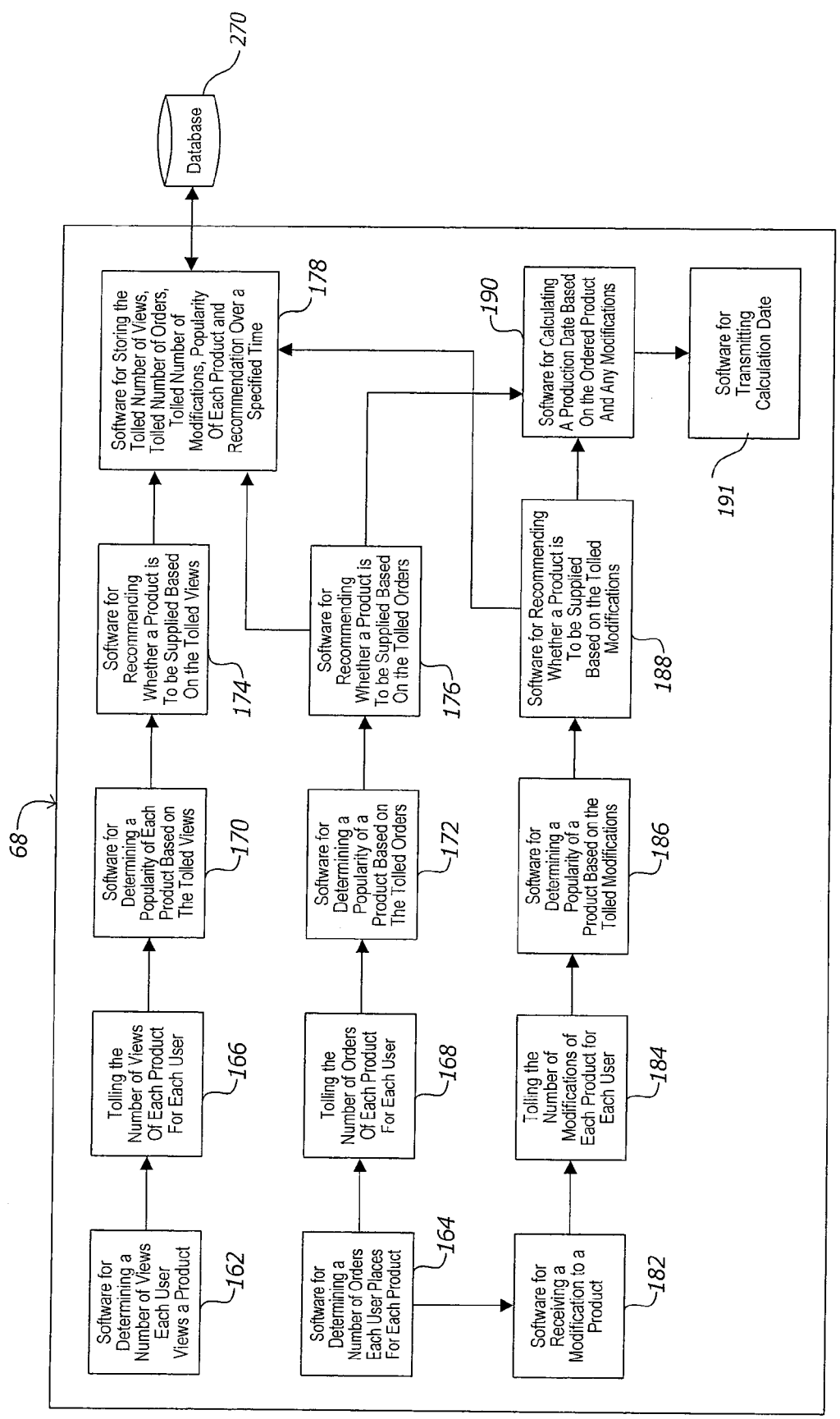
FIG. 2 more particularly depicts the software for forecasting shown in FIG. 1.

FIG. 2 more particularly depicts software 68 for forecasting consumer interest, calculating production date, and marketing recommendations, which is shown more generally in FIG. 1. Software 68 for forecasting consumer interest, calculating production date, and marketing recommendations includes software 162 for determining a number of views each user views a product, software 166 for totaling the number of views of each product for each user, software 170 for determining a popularity of each product based on the tolled views, and software 174 for recommending whether or not a product is to be supplied based on the tolled views.

Software 68 for forecasting consumer interest, calculating production date, and marketing recommendations also includes software 164 for determining a number of orders each user places for each product, software 168 for totaling the number of orders of each product for each user, software 172 for determining a popularity of each product based on the tolled orders, and software 176 for recommending whether or not a product is to be supplied based on the tolled orders.

In this effort, software 68 for forecasting consumer interest, calculating a production date, and marketing recommendations not only tracks the number of orders made, but also tracks the number of views a product receives based at least in part on the number of clicks a user makes to see a particular webpage. Similarly, in addition to tolling the number of orders for each product, the invention tolls the number of views a webpage receives and this occurs for each webpage so that a popularity of each product may be determined. Based on the popularity of a product based at least in part on the tolled views or tolled orders or both for that product, the invention recommends whether or not to incur the expenses in supplying the product.

After determining the recommendations based on the tolled views or tolled orders. Software 178 stores the tolled number of views, tolled number of orders, popularity of each product, and recommendation over a specified time. It is understood that any data specified herein may be saved onto a database at any time, such as storing the tolled number of views of each product before determining a popularity of that product. Hence, information may be stored at any time since there is no requirement that all tolling and recommendations need to be completed before any of the data is stored onto database 270.

Similar to the above steps related to the views and orders, the invention also includes software 182 for receiving a modification to a product, software 184 for tolling the number of modifications of each product for each user, software 186 for determining a popularity of a product based on the tolled modifications, and software 188 for recommending whether or not a product is to be supplied based on the tolled modifications.

As suggested above, software 178 for storing information may store the tolled number of modifications for each product after all modifications for all products are tolled or information may be stored each time a modification is made to a product.

Software 190 for calculating a production date based on the number of orders and/or the number of modifications to a product calculates the date after all popularity or recommendations are completed for the product. The total number of orders and the total number of modifications, not to mention the kinds of modifications, may affect lead time and, therefore, calculating the production date may not be possible until all orders and requests for modifications are received.

After the calculation date, software 191 for transmitting the calculation date, or forecast/recommendation 274, sends the calculation date to the product supplier or, upon authorization by the product supplier, to the customer. After receipt of forecast/recommendation 274, the product supplier has veto power and final say to set another calculation date or follow forecast/recommendation 274, whereupon confirmed production date 296 would be sent (see FIG. 3) to computer 18 and received by software 222 for receiving the confirmed production date, whereupon prompt 295 to contact the consumer would be automatically sent when the confirmed production date approaches. Prompt 295 can be set to be automatically sent at any arbitrary time period time before the production date, where the arbitrary time period is determined by the product supplier, whether it is 1 day, 1 week, or any number of days or weeks. Prompt 295 is sent by software 220 for prompting the product supplier to contact the consumer.

Figure 3:
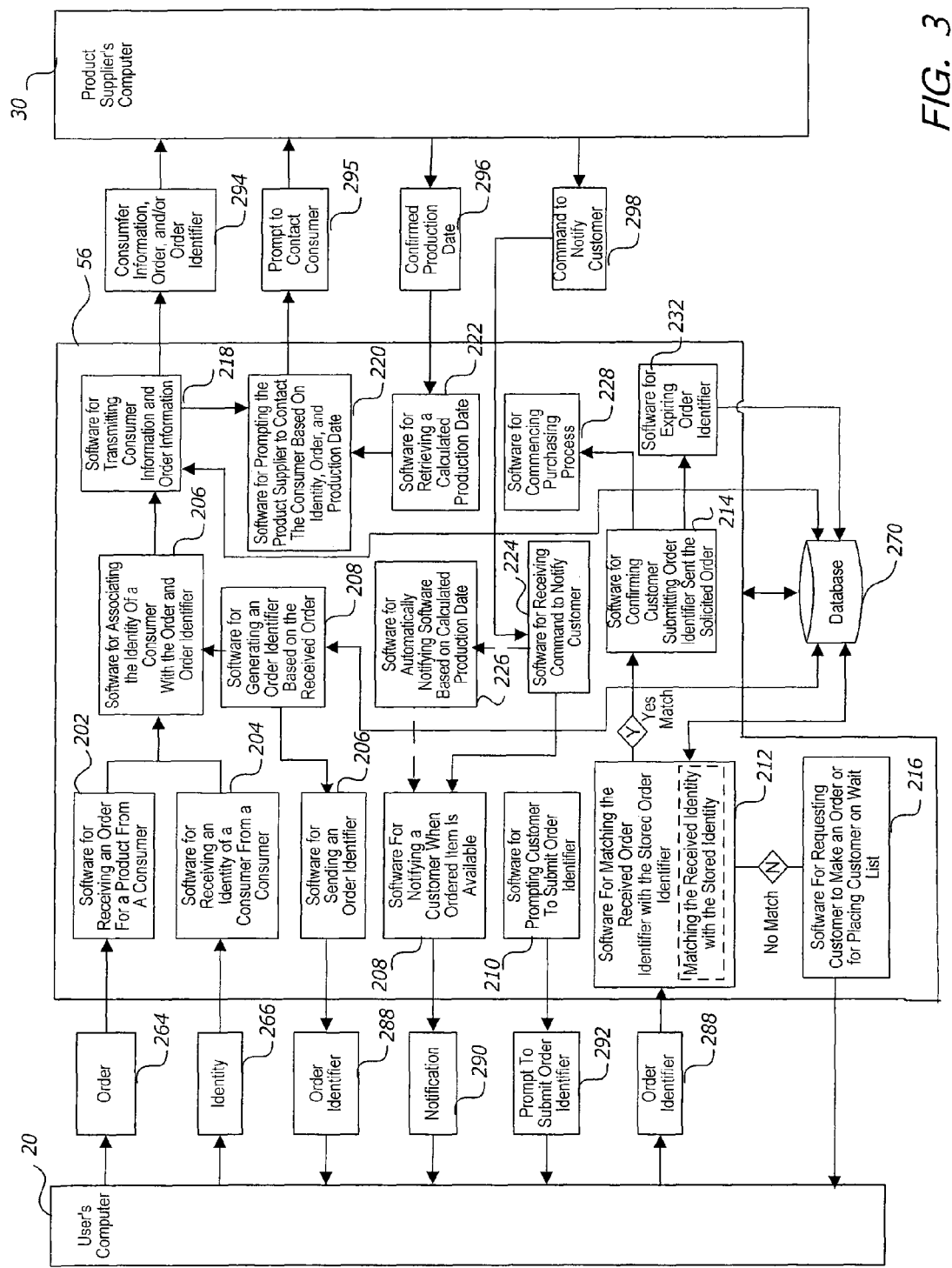
FIG. 3 more particularly depicts the software for receiving consumer information shown in FIG. 1.

FIG. 3 more particularly depicts software 56 for receiving consumer information, includes software 202 for receiving order 264 and software 204 for receiving a user's identity 266, both order 264 and identity 266 being sent by a user operating user's computer 20. When order 264 is received, software 208 for generating an order identifier generates identifier 288 and software 206 for sending an order identifier sends order identifier 288 to user's computer 20 that identifies the order by a special code, which may be a reservation number or alphanumeric password unique to the order and/or user. Additionally, software 206 for associating the identity of a consumer with the order and order identifier corresponds or links each user's identity with order 264 sent by that user and order identifier 288 sent to that user. A later submission of order identifier 288 by the user would automatically bring up the user's identity and order and other information related to order identifier 288. Software 208 for generating order identifier 288 also sends a copy of it to database 270 along with identity 266.

Order identifier 288 is advantageous because the user's identity and order comprise words or letters that may be difficult to coordinate with the particular item that is being ordered. Order identifier 288, which may be a password that is numeric or alphanumeric, may have a first number for identifying the item to be ordered followed by a size, color, date, or customer identifier. For example, a password or order identifier 02085B001 may represent item 02, which may be stored in database 270 as men's dress shoe called a penny loafer, having a size of 8½, which is represented by 085, and having a color of brown, identified as B is the password, and the customer is identified as 001. Once this password is received by software 56 for receiving consumer information, other information would be available, such as the date and status of the order as well as other demographic information. This abundance of information may be difficult to store without uniform identifiers for item style, size, and the like. It should be known that software 208 for generating order identifier assigns a unique order identifier for each user.

After order 264 and identity 266 are received and associated by software 206 for associating order 264 and identity 266, software 218 for transmitting consumer information 67, order 264, and/or order identifier 266 sends any combination 294 of this information to product supplier 30.

When the item being ordered arrives or becomes available for the user to purchase and take possession, software 208 for notifying a customer a customer sends notification 290 to the user and prompts 210 the user to send order identifier 288. In some embodiments, software 210 prompts the user when the user responds to the notification. The notification may be an email with a link that directs the user to a webpage, whereupon prompt 292 for order identifier 288 automatically pops up or is displayed on the webpage.

As described above under FIG. 2, prompt 295 is sent to product supplier 30 to contact the consumer that the production date is approaching. Product supplier 30 sends command 298 to software 224 for receiving command 298 to notify the customer, whereupon software 208 for notifying the customer sends notification 290.

In another embodiment, when sending confirmed production date 296, product supplier 30 also sends command 298 to automatically notify the customer at the beginning of the arbitrarily determined time period described above, where software 226 for automatically notifying the customer of the availability of the item ordered, which obviates the need to send prompt 295 to contact the consumer to product supplier 30.

Once order identifier 288 is sent by the user, software 212 for matching received order identifier 288 compares the received order identifier with the stored order identifier on database 270. Once a match is found, software 214 for confirming the customer submitting order identifier 288 is the customer that made or sent original order 264, or reservation. In some embodiments, software 210 prompting a customer to submit order identifier 288 also prompts the customer to submit identity 266, whereupon software 212 for matching also compares the received identity with the stored identity in addition to identifier 288. Software 214 for conforming confirms other details of order identifier 288 and order 264, such as the color availability, size, and the like. This may be done through a series of emails automatically generated by computer 18 based on the stored data at database 270.

If software 212 for matching does not detect a match of received order identifier with any on database 270, software 216 for requesting a customer would ask the customer to submit an order or to be put on a wait list for the item.

After confirmation is complete and the customer sending order identifier 288 is confirmed to be the customer who originally placed order 264, software 228 for commencing purchasing process asks for payment and shipping information, such as a credit card number and whether or not the customer wants express or standard delivery.

Also after confirmation is complete, software 232 for expiring order identifier 288 expires the order identifier and updates database 270 of such expiration.

Figure 4:
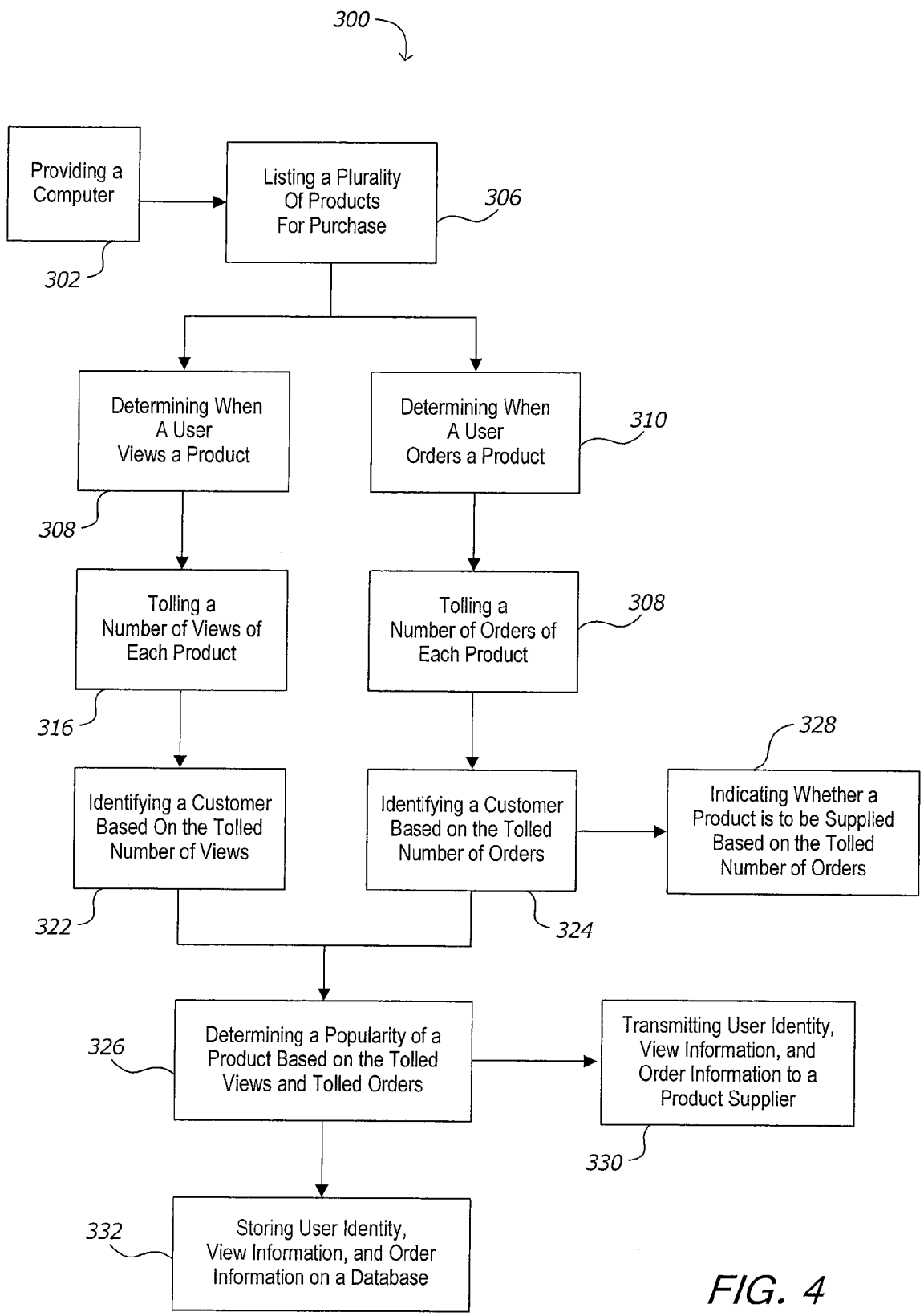
FIG. 4 depicts a method for providing the system shown in FIG. 1.

FIG. 4 depicts method 300 for providing the system described above for ordering a product and forecasting consumer interest. Method 300 includes the steps of providing 302 a computer, listing 306 a plurality of products available for purchase on the computer, determining 308 when a user views a product, determining 310 when a user orders a product. Moreover, method 300 tolls 316 the number of views a user views each product and method 300 tolls 318 the number of orders of each product.

In this effort, by the frequency of visits to a webpage or views of a product, method 300 determines and identifies a consumer who may have a favorable potential for purchasing a product even though that consumer did not place an order. By tracking the frequency of views, method 300 can identify 322 a user with a higher potential for purchasing than another user who does not frequent the webpage or who does not frequently view a product. In the same effort, method 300 identifies 324 a customer based on the tolled number of orders.

Based on the tolled number of orders, method 300 includes software for indicating 328 whether a product is to be supplied. Additionally, method 300 determines 326 a popularity of a product based on the tolled views and tolled orders.

In either case whether or not a user orders a product or simply views a product, method 300 transmits 330 user identity, view information, and order information to a product supplier so that a product supplier may review the stored 332 user identity, stored view information, and stored order information from a database.

What is claimed is:

1. A system for ordering a product and forecasting consumer interest, comprising:
    a computer;
    software executing on said computer for listing a plurality of products for purchase;
    software executing on said computer for determining when a user views a product of the plurality of products;
    software executing on said computer for determining when a user orders a product of the plurality of products;
    software executing on said computer for tolling the views of each product and for tolling the orders of each product;
    software executing on said computer for tolling the number of modifications of each product for each user;
    software executing on said computer for identifying a first customer based on the tolled views;
    software executing on said computer for identifying a second customer based on the tolled orders; and
    software executing on said computer for indicating whether a product is to be supplied based on the tolled number of orders and modifications for the product.

2. The system according to claim 1, further comprising software executing on said computer for transmitting the identity of the first customer to a product supplier.

3. The system according to claim 1, further comprising software executing on said computer for transmitting the identity of the second customer to a product supplier.

4. The system according to claim 1, further comprising software executing on said computer for determining a popularity of each product based on the tolled views and the tolled orders.

5. The system according to claim 1, further comprising software executing on said computer for storing a list of products based on a frequency of tolled views.

6. The system according to claim 1, further comprising software executing on said computer for storing a list of products based on a frequency of tolled orders.

7. A system for ordering a product and forecasting consumer interest, comprising:
    a computer;
    software executing on said computer for receiving a plurality of orders for various products among a plurality of products;
    software executing on said computer for receiving a plurality of modifications to the various products;
    software executing on said computer for tolling orders for each product of the plurality of products to determine a popularity of each product based on the tolled orders;
    software executing on said computer for tolling modifications for each product of the plurality of products to determine a popularity of each product based on the tolled modifications;
    software executing on said computer for storing a list of the plurality of products based on the frequency of orders of each product;
    software executing on said computer for storing a list of the plurality of products based on the frequency of modifications of each product;
    software executing on said computer for indicating whether a product is to be supplied based on the tolled orders and tolled modifications for the product; and
    software executing on said computer for transmitting the orders and modifications to a product supplier.

8. The system according to claim 7, further comprising software executing on said computer for receiving a plurality of modifications for a single order.

9. A method for ordering a product and forecasting consumer interest, comprising the steps of:
    providing a computer;
    listing a plurality of products for purchase;
    using said computer for determining when a user views a product of the plurality of products;
    using said computer for determining when a user orders a product of the plurality of products;
    using said computer for determining when a user orders a modification to a product of the plurality of products;

tolling a number of views of each product using said computer;

tolling a number of orders of each product using said computer;

tolling a number of modifications of each product using said computer;

identifying a first customer based on the tolled views;

identifying a second customer based on the tolled orders; and indicating whether a product is to be supplied based on the tolled number of orders and modifications for the product.

10. The method according to claim 9, further comprising transmitting the identity of the first and second customers to a product supplier.

11. The method according to claim 9, further comprising determining a popularity of each product based on the tolled views and the tolled orders.

12. The method according to claim 9, further comprising storing a list of products based on the tolled views and the tolled orders.

13. A system for ordering a product, comprising:

a computer;

software executing on said computer for soliciting an order from a customer for an item that is not yet and may never be available for purchase;

software executing on said computer for receiving the order;

software executing on said computer for sending an order identifier to the customer, each order identifier including an indication of the ordered item;

software executing on said computer for storing the order identifier;

software executing on said computer for notifying the customer when the ordered item is available for purchase;

software executing on said computer for prompting the customer to submit the order identifier; and software executing on said computer for matching the received order identifier with the stored order identifier for confirming the customer placed the reservation.

14. The system according to claim 13, further comprising software executing on said computer for confirming the customer submitting the order identifier sent the solicited reservation by matching the received order identifier with the stored order identifier.

15. The system according to claim 13, further comprising software executing on said computer for prompting the customer to submit an identity of the customer;

software executing on said computer for storing the identity;

software executing on said computer for prompting the customer to submit the identity contemporaneously with prompting the customer to submit the order identifier; and software executing on said computer for matching the received identity and received order identifier with the stored identity and stored order identifier.

16. The system according to claim 13, further comprising software executing on said computer for masking the solicitation of a reservation from certain customers while permitting other customers to view the solicitation of a reservation.

17. The system according to claim 13, further comprising software executing on said computer for reminding the customer the item is available for purchase.

18. The system according to claim 13, further comprising software executing on said computer for displaying a list of items available to be provided, each item being reservable by the customer.

19. The system according to claim 13, further comprising software executing on said computer for updating the list based on the received reservations.

20. The system according to claim 13, further comprising software executing on said computer for expiring the received reservation upon receipt of the order identifier by the customer.

* * * * *